Aug. 2, 1966  L. B. LEONARD ET AL  3,264,205
LEAK STRUCTURE FOR ELECTROCHEMICAL ELECTRODES
Original Filed June 25, 1962

INVENTOR.
LYNN B. LEONARD
BY HIDEO WATANABE

Thomas L. Peterson
ATTORNEY

United States Patent Office 3,264,205
Patented August 2, 1966

3,264,205
LEAK STRUCTURE FOR ELECTROCHEMICAL
ELECTRODES
Lynn B. Leonard and Hideo Watanabe, Fullerton, Calif.,
assignors to Beckman Instruments, Inc., a corporation
of California
Continuation of application Ser. No. 204,770, June 25,
1962. This application July 30, 1963, Ser. No. 298,655
10 Claims. (Cl. 204—195)

This application is a continuation of application Ser. No. 204,770, filed June 25, 1962, and assigned to the assignee of the present application, now abandoned.

This invention relates to reference electrodes for electrochemical measurements. Mor particularly, the invention relates to leak structures and, specifically, ceramic leak structures that serve to define a path for allowing flow of a salt bridge solution to a liquid sample at a low and highly reproducible rate.

In electrochemical measurements and, specifically, potentiometric measurements there is usually utilized a measuring half cell and a reference half cell. The measuring half cell may be a high impedance device such as a glass "electrode" as utilized in the determination of pH, pNa and $pCO_2$ that generates a potential with respect to the liquid sample medium, said potential being a function of its composition. The reference electrode provides a potential that is substantially independent of the variable composition of the sample and as much as possible from other parameters. The reference half cell comprises generally a piece of metal in contact with a mass of sparingly soluble salt of that metal, the assembly being placed in a salt bridge solution. The salt bridge solution has a nonmetallic ion in common with the sparingly soluble metal salt. In order to establish contact between the metal and the sample solution there is generally provided a leak structure that allows constant, low rate flow from the salt bridge solution that is stored in the electrode vessel towards the liquid medium under test. Well known examples of reference half cells, commonly referred to as reference "electrodes," are the silver-silver chloride electrode and the calomel electrode. The electrolyte or salt bridge solutions for both types is usually potassium-chloride in view of the fact that the ion mobilities of potassium and chlorine do not differ greatly, which circumstance is beneficial for the stable performance of the electrode.

As mentioned before, the present invention deals with the leak structures that allow the formation of a socalled liquid junction between the salt bridge solution and the liquid sample medium. A suitable leak structure should as much as possible fulfill the following requirements:

(1) It should allow liquid flow under moderate pressure at an even, continuous, very low rate. Interruption of the flow would result in the electrode system becoming inoperable whereas a high flow rate is often not acceptable because it would require frequent filling of the electrode vessel with the salt bridge solution which is not tolerable in many applications.

(2) The liquid junction whose shape is defined by the leak structure should have a low impedance. Upon initial consideration, one might wonder why in an electrode system, in which the measuring electrode may have as high impedance, usually many megohms, the other element that is in series therewith should have a low impedance, preferably less than one thousandth of that of the measuring element of the chain. The reason is that the measuring electrode, in potentiometric measuring circuits, is coupled to an input terminal of the amplifier whereas the reference electrode is coupled to an output terminal and through a relatively low impedance feedback element to ground or other reference point. The sample solution itself is often at a potential that randomly varies from the reference potential; accordingly, a current flows from the test solution through the liquid junction to the reference point which current causes a variable voltage drop across the liquid junction, whereby said voltage drop may disturb the accuracy of the measurement unless the impedance of the reference electrode and consequently the voltage drop thereacross is low.

(3) It is desirable that the leak structure is not easily clogged. This clogging may occur when the sample is not simply an aqueous solution but a two phase system, such as a slurry, as used in soil testing, for instance, or a suspension such as latex, to mention a few examples.

(4) The leak structure should allow the liquid flow of the salt bridge solution to be easily started, notwithstanding the low flow rate requirement mentioned above.

(5) The leak structure itself should under no circumstances contribute to the generation of potentials that are a function of the sample composition.

(6) The leak structure should preferably be easily cleanable once it should become contaminated.

Some leak structures for reference electrodes that are known in the art will be reviewed and evaluated below in view of the foregoing requirements.

Asbestos fibers fused in the glass wall of the salt bridge containing vessel have been used as leak structures. These allow a reasonably low flow rate when a few fibers are used only and usually start the flow automatically. However, they become easily clogged in two phase systems and it is difficult to clean them.

Porous ceramic plugs have been used as leak structures. In one type the ceramic plug is prefabricated and then fused into place in a suitable perforation of the glass wall. In another more recent type a porous ceramic type plug is manufactured in situ by filling a perforation of the glass wall with a mixture of powdered glass and a particulate, inert material having a high melting point and subsequently fusing the powdered glass. Though the more recent type of ceramic plug is an important improvement over older techniques, it requires considerable skill to make this type of leak structure. All ceramic plug type leaks of the prior art that have the desirable low flow rate have a relatively small, outer surface at the sample side so that they become fairly easily clogged. After the junction is clogged it often is difficult to start the liquid flowing again because surface tension effects prevent the penetration of liquid through the air pockets that may be formed in these structures.

Sleeve type leak structures have also been used. These comprise a small hole in a glass vessel that is closed by a ground sleeve that is not quite tight enough to close the liquid flow. This is the type that has been most successful for use in multi-phase systems such as slurries because they are so easily cleaned. However, a serious disadvantage is that it has not been possible to adjust these leak structures to very low flow rates.

There has also been developed the so-called palladium leak structure. In this structure, a palladium wire is fused into a glass wall of the electrode vessel having a temperature coefficient slightly lower than that of palladium. Upon cooling, the glass partially withdraws from the wire so that a very fine leak is created. This structure allows extremely low flow rates. One serious disadvantage however is that when the sample has strongly oxidizing or reducing properties the potential of the reference cell varies due to the circumstance that palladium is electrochemically active.

The principal object of the present invention is to provide a leak structure that is substantially free from the disadvantages of the leak structures of the prior art and, more specifically, to provide a chemically inert ceramic leak structure that allows low flow rates, but whose flow can nonetheless be easily started, that does not become clogged in multiphase systems, or can be easily cleaned when contaminated.

It is another object of the invention to provide a method for making a leak structure, which method can be performed without a high degree of mechanical skill and at low cost.

According to the principal aspect of the present invention, there is provided a ceramic leak structure for an electrochemical reference electrode serving to define a path for flowing salt bridge solution to a liquid sample, which comprises a thin coating of partially fused, porous ceramic material that is firmly adhered by fusion to a glass vessel that holds the salt solution. Also in accordance with the invention, the method for making the leak structure comprises dipping a vessel of a heat resistant glass that has to support the coating in a ceramic slip, drying said ceramic slip and subsequently heating the supporting glass structure to a temperature at which the ceramic slip becomes partly fused and adheres strongly to said supporting glass structure.

Other objects and advantages of the invention will become more apparent upon reference to the following specification and claims and appended drawings wherein:

Figure 1:
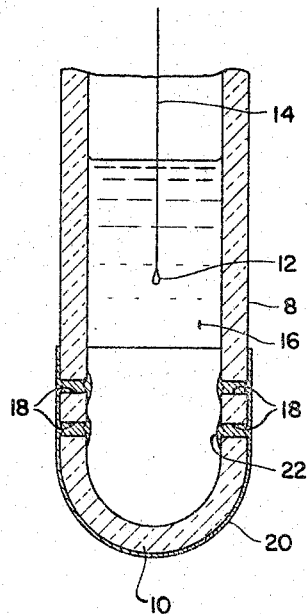
FIG. 1 is a sectional view of an electrochemical reference half cell embodying the liquid junction of the present invention.

Referring now to FIG. 1, there is shown a reference half cell of the type used in electrochemical determinations such as pH measurements. The half cell comprises a glass tube 8 having a closed bottom portion 10. A reference electrode 12 of any suitable type is positioned within the tube 8; as illustrated, this electrode is a silver-silver chloride electrode formed on the end of a lead wire 14. The interior of the tube 8 is filled with a body of electrolyte 16, preferably potassium chloride solution, in most cases a saturated solution, to a level above the electrode 12. This electrolyte serves as the salt bridge between the electrode 12 and the sample solution into which the half cell is immersed. In order that ionic communication be established between the salt solution 16 and the sample the reference half cell is provided with a leak structure according to the present invention. As illustrated, this leak structure is formed in a plurality of small holes 18 formed in the tube 8 and comprises a body of porous ceramic material which coats the outside of the lower portion of the tube and extends through holes 18 formed in the tube 8 to form knobs 22 on the interior of the tube.

In the fabrication of the reference half cell, the holes 18 are formed by piercing one end of the tube 8 with a suitable diameter hot wire. Any number of these holes may be provided, depending on their size and the volume of flow which is desired. The perforated tubing is then dipped into a thick slurry of clay-like material commonly known as ceramic slip. Any number of such slurries are known and may be used for the purposes of the present invention. An illustrative example of such a composition comprises 50% California talc by weight dry, 16% Kentucky No. 4 ball clay, 16% plastic vitrox (flint-feldspar), 16% Tennessee No. 1 ball clay and 2% Kentucky special ball clay.

This composition is then mixed with water to form the slip and the tube dipped into it so that the highest hole in the tube is submerged. The slip flows easily enough so that a small quantity will ooze into the inside of the tubing through the hot wire holes 18. The tubing 8 is then immediately withdrawn from the slip and allowed to drain and dry. If desired, the tube may be dipped several times in order to obtain a desired thickness. Between each dipping, however, the dipped surface must be sufficiently dry so that the new coating will adhere.

After a coating of desired thickness of the ceramic material is attained, the coating is thoroughly dried and then fused. Fusion is performed by applying heat using an oven or an open torch or other suitable means. The coating must be heated to a temperature sufficient to partially fuse the ceramic mass but not sufficient to cause it to run and totally fuse. An over-fired coating will become impervious to water penetration and thus be useless as a liquid junction. Although the temperature range for proper fusion varies from material to material, generally speaking the ceramic mass should be heated to a temperature of approximately 820° centigrade when the tubing to be coated is Corning 7740 Pyrex glass. This temperature will cause the coating to turn cherry red, thereby giving an indication of sufficient heating to one skilled in the art. It is also necessary that the salt bridge tube be heated above the softening point of Pyrex glass so that the coating and the portions of the mass extending through the holes 18 will form a firm bond with the surface of the tube and thus maintain the ceramic material on the surface and in the holes after the assembly has been cooled.

A coating made by this method will generally be about .001 to .005 inch thick, and under eight inches of head pressure saturated potassium chloride will flow out of the tubing at the rate of .01 to .1 milliliter in twenty-four hours. This flow rate can be varied depending upon the fusion temperature, it being obvious that the further the fusion progresses the smaller will be the rate of flow. The electrical resistance of a liquid junction formed in this structure has been determined to be as low as 1500 ohms.

Figure 2:
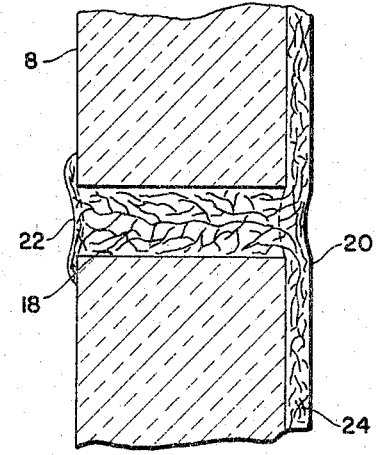
FIG. 2 is an enlarged view of a portion of the liquid junction of FIG. 1.

The advantages of a leak structure defining a liquid junction of this type may be seen by referring to FIG. 2. This figure shows in much enlarged form a portion of the half cell assembly shown in FIG. 1. As may be seen, the ceramic material 20 forming the coating on the tube 8, extending through the hole 18 and forming the knob 22 is traversed by a plurality of capillary passageways. The great number of these passageways extending from the interior of the tube to its exterior, together with the large surface area presented to the sample medium makes the liquid junction path formed in the leak structure of the present invention extremely resistant to clogging and plugging and hence highly satisfactory for use in samples that contain non-aqueous material in suspension.

The fine porosity of the tube can be easily observed when a vessel for a reference half cell according to FIG. 1 is first filled with water. On wetting the ceramic coating, which is light in color, becomes darker. Soon after filling, the entire surface of the coating assumes the slightly darker color, indicating that capillary flow to the outside of the tube is not restricted to the immediate surroundings of the holes 18 but is distributed throughout the entire content of the ceramic body.

Figure 3:
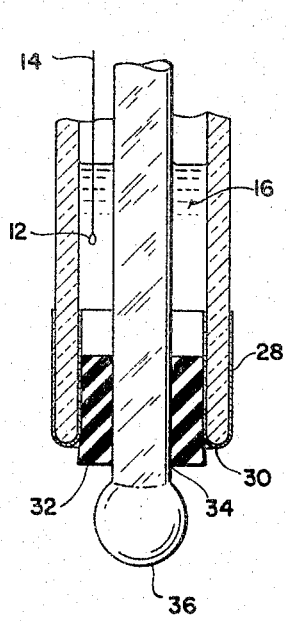
FIG. 3 is a view partly in section of one embodiment of a combination electrode assembly incorporating the liquid junction of the present invention.
Figure 4:
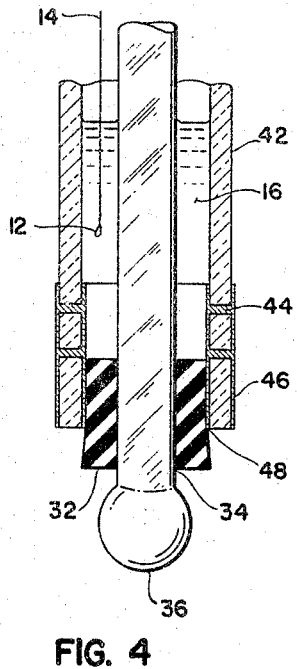
FIG. 4 is a second embodiment of a combination electrode incorporating the liquid junction of the present invention.
Figure 5:
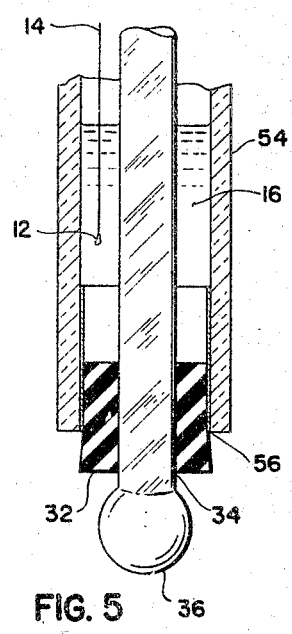
FIG. 5 is a third embodiment of a combination electrode assembly incorporating the liquid junction of the present invention.

The leak structure of the present invention may also be incorporated in combination electrochemical assemblies, i.e., electrode assemblies containing both reference half cells and sensing half cells. In FIGS. 3, 4, and 5, elements that are similar in structure to those shown in FIG. 1 are denoted by the same numerals. Referring now to FIG. 3, there is shown a combination electrode assembly formed by diping an open-ended glass tube 26 into a suitable ceramic slip such as the one described above. A coating is formed on both the inside and the outside of the tube, the two coatings being joined by a bridge 30 of the ceramic material. After the desired thickness has been coated onto the tube, it is dried and fired in the same manner as described in connection with FIG. 1. A rubber plug 32 having an annular central aperture for holding a sensing half cell 34 is then forced in the end of the coated tube 26. The sensing electrode is provided with a bulbous head 36 of pH sensitive glass which together with a reference electrode 12 positioned within the tube 26 by a lead wire 40 will enable the electrode assembly to make electrochemical determinations such as pH measurements. As was the case in FIG. 1, the reference electrode is immersed in a suitable electrolyte 16. The ceramic material 28 serves as a liquid junction defining path between the electrolyte 16 and the sample medium allowing many capillary passageways extending from the interior coating on the tube 26 through the bridge 30 to the sample medium and also through the bridge 30 to the annular outer coating and thence to the sample material.

A suitable combination electrode assembly may also be made as shown in FIG. 4. In order to form this electrode assembly, a tube 42 similar to the tube 26 is provided with a plurality of hot wire holes 44 similar to the hot wire holes 18 of FIG. 1. The tube 42 is then dipped in the ceramic slip so that a coating 46 is formed on the outer surface of the tube and a coating 48 is formed on the inner surface of the tube, the two coatings being connected by ceramic material which oozes through the holes 44. The liquid junction is then dried and fired as was the case in FIGS. 1 and 3 until the proper degree of fusion has taken place. The end of the tube is then ground down to remove any bridge portion similar to the bridge 30 of FIG. 3. A rubber plug 32 together with a sensing electrode 52 is then inserted into the end of the tube that has the reference half cell elements provided in its interior. In this embodiment of the invention, communication is made from the electrolyte to the sample medium by the passageways that extend from the inner surface of the coating 48 through the holes 44 and coating 46 and also through the lower surface of the inner coating 48.

FIG. 5 shows another embodiment of a combination electrode assembly according to the present invention. In this figure, a tube 54 similar to the tube 26 is dipped into a ceramic slurry. In this embodiment, however, the coating formed on the exterior of the tube is wiped away and only the interior coating 56 allowed to dry. The coating 56 is then fired in the same manner as described previously and the structure again assembled with a rubber plug 32, a sensing electrode 34 and a reference electrode 12. The liquid junction in this embodiment is made up of the passageways extending from the inner surface of the coating 56 above the rubber plug to the lower surface of this coating.

The structure of FIG. 5 is particularly advantageous when a very low rate of flow is desirable. The leak structure formed by the ceramic coating 56 on the inside of the tube 54 has an extremely small cross section in the direction of flow, that is in the axial direction of the tube. Heretofore, when ceramic plugs having a comparable small cross section were made in a large percentage of the structures, it was next to impossible to get the flow of KCl solution to start apparently because air pockets formed in the leak structure prevented wetting.

This problem does not exist with the leak structures shown in FIG. 5. The ceramic coating is simply dipped in KCl solution prior to the mounting of plug 32 within the tube 54. Even when this coating would become dry by the time the combination electrode is put in actual use the flow of salt bridge solution is readily started because the dipping in KCl solution and subsequent drying will cause the formation of numerous KCl crystals within the coated leak structure whereby, apparently, effects similar to osmosis allow an easy starting of the low rate continuous flow. Another advantage of the structure of FIG. 5 in comparison with leak structures of the prior art is that it is possible to remove the rubber plug and clean the leak structure and restore it to its original status should it become contaminated, such as may occur due to inexpert use.

Obviously the leak structure of FIG. 5 comprising a ceramic porous coating on the inside of a tube in which a stopper is held is not necessarily used in combination with a measuring electrode but may be used in conjunction with a reference half cell alone, in which case the stopper is not perforated. Furthermore, it should be observed that the advantages of a large open surface of the ceramic leak structure at the side of the sample may be obtained by utilizing a stopper that is somewhat recessed.

In FIGS. 3, 4 and 5, the inner coating can be reamed to form a better seat for the rubber plugs if such is found to be necessary or desirable.

In principle, the ceramic coating could be made on the outside of the stem of the glass electrode instead of on the lower portion of the surrounding vessel for the reference half cell. However, the latter is usually made of a special high impedance glass that softens at a lower temperature. As the best performance of the leak structure of the invention is obtained by fusing at a rather high temperature (about 820°), which is more than the present day stem glasses will allow, the technique as described is presently preferred. It should be obvious, however, that it would be perfectly possible, for instance, to coat a solid rod of a suitable glass in the way described and insert this in a perforated stopper so as to form a leak structure.

As may be seen from the foregoing description, various methods have been provided for forming liquid junction defining leak structures for electrochemical electrode assemblies. These liquid junction defining structures enable these assemblies to be used in slurry-like or two phase samples for long periods of time without plugging or clogging, allow a low flow rate, start the flow easily, are easily cleaned, and in which liquid junctions are formed having a low electrical impedance.

The invention may be embodied in other specific forms not departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. A method of forming a liquid junction for an electrochemical glass salt bridge tube having an open end comprising the steps of:
   dipping the open end of the tube into a ceramic slip to form a coating of ceramic material on the exterior and interior of said tube and at the end of said tube;
   drying said coating; and
   heating said end of said tube until the ceramic material partially fuses and adheres by fusion to said tube.

2. A method of forming a liquid junction for an electrochemical glass salt bridge tube having at least one opening near one end thereof, comprising the steps of:
   dipping said end of said tube into a ceramic slip up to at least said opening to form a coating of ceramic material on the exterior of said tube and to form a bridge of ceramic material between the interior and exterior of said tube through said opening;
   drying said coating and bridge; and heating said end of said tube until the ceramic material partially fuses and adheres by fusion to said tube.

3. A method of forming a liquid junction for an electrochemical glass salt bridge tube comprising:
   piercing said tube to form at least one minute opening adjacent one end of the tube;
   dipping said end of said tube into a ceramic slip up to at least said minute opening to form a coating of ceramic material on the exterior of said tube and to form a bridge of ceramic material between the interior of said tube and the exterior coating through said opening;
   drying said coating and bridge; and
   heating said end of said tube until the ceramic material partially fuses and adheres by fusion to said tube.

4. The method as set forth in claim 2 in which said coating is heated to a temperature of about 820° C.

5. In an electrochemical electrode assembly including a glass salt bridge tube having an opening therein adjacent one end of the tube, a liquid junction comprising:
   a first coating of porous ceramic material bonded to and covering the exterior of said one end of the tube and extending over said opening;
   a second coating of porous ceramic material bonded to the interior of said tube and surrounding said opening; and
   a bridge of porous ceramic material filling said opening and being integral with said first and second ceramic coatings.

6. An electrochemical electrode assembly as set forth in claim 5 wherein the thickness of said coatings is of the order of about .005 inch or less.

7. In an electrochemical electrode assembly, the combination of:
   a glass salt bridge tube having at least one minute opening therein adjacent one end of the tube for establishing fluid communication between the interior and exterior of said tube;
   a first coating of partially fused porous ceramic material bonded to and covering the exterior of said one end of the tube and extending over said opening;
   a second coating of partially fused porous ceramic material bonded to the interior of said tube and extending over said opening; and
   a bridge of partially fused porous ceramic material filling said opening and being integral with said first and second ceramic coatings.

8. In an electrochemical electrode assembly including a glass salt bridge tube having an open end, a liquid junction comprising:
   a coating of porous ceramic material bonded to the entire interior of said tube at said open end; and
   impervious means other than said ceramic material closing the portion of said open end of said tube not occupied by the ceramic coating whereby said coating forms a leakage path between said means and the wall of said tube, said leakage path establishing fluid communication between the interior and exterior of said tube.

9. An electrochemical electrode assembly as set forth in claim 8 wherein said closing means comprises a stopper having a central opening therein substantially aligned with the axis of said tube, and a sensing half cell positioned in said tube and having a portion thereof extending through said central opening externally of said tube.

10. A method as set forth in claim 1 including the additional step of wiping off said coating from the exterior of said tube after dipping said tube into said ceramic slip but prior to drying of said coating.

References Cited by the Examiner

UNITED STATES PATENTS

| 2,346,470 | 4/1944 | Cary et al. | 204—195.1 |
| 2,925,370 | 2/1960 | Rohrer | 204—195 |
| 2,927,887 | 3/1960 | Proctor | 204—195 |

FOREIGN PATENTS

| 678,648 | 9/1952 | Great Britain. |

HOWARD S. WILLIAMS, *Primary Examiner.*
WINSTON A. DOUGLAS, JOHN H. MACK,
*Examiners.*
T. TUNG, *Assistant Examiner.*